(12) United States Patent
Nüesch et al.

(10) Patent No.: US 6,844,506 B2
(45) Date of Patent: Jan. 18, 2005

(54) MEASURING APPARATUS WITH USER PROFILE

(75) Inventors: Reto Nüesch, Greifensee (CH); Matthias Gietenbruch, Buchs (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/361,816

(22) Filed: Feb. 11, 2003

(65) Prior Publication Data

US 2003/0141116 A1 Jul. 31, 2003

Related U.S. Application Data

(63) Continuation of application No. PCT/IB01/01438, filed on Aug. 13, 2001.

(30) Foreign Application Priority Data

Aug. 14, 2000 (DE) .......................................... 10039668.2

(51) Int. Cl.[7] ............................................ G01G 19/00
(52) U.S. Cl. ................... 177/25.11; 177/25.13; 177/25.19; 700/305; 702/122; 702/123; 702/174; 705/416; 340/5.52; 340/5.61; 340/5.82
(58) Field of Search ............................ 340/5.52, 5.53, 340/5.82–5.84, 5.61; 702/174, 122, 123; 705/416; 177/25.11–25.17, 25.19; 700/305

(56) References Cited

U.S. PATENT DOCUMENTS

| | | | |
|---|---|---|---|
| 4,517,563 A | 5/1985 | Diamant ................ 340/825.54 |
| 4,676,327 A | 6/1987 | Luechinger ................ 177/126 |
| 5,009,276 A * | 4/1991 | Raikes et al. ............ 177/25.15 |
| 5,600,781 A | 2/1997 | Root et al. .................. 395/326 |
| 5,822,707 A * | 10/1998 | Breed et al. .................. 701/49 |
| 5,841,076 A * | 11/1998 | Schwartz et al. ........ 177/25.13 |
| 5,956,505 A * | 9/1999 | Manduley ................... 705/416 |
| 6,021,212 A * | 2/2000 | Ho ............................. 340/5.82 |
| 6,038,465 A * | 3/2000 | Melton, Jr. ............... 177/25.19 |
| 6,081,750 A | 6/2000 | Hoffberg et al. .............. 700/17 |
| 6,100,811 A * | 8/2000 | Hsu et al. ................... 340/5.82 |
| 6,256,402 B1 * | 7/2001 | Terao ......................... 340/5.52 |
| 6,424,884 B1 * | 7/2002 | Brooke et al. .............. 700/232 |
| 6,522,772 B1 * | 2/2003 | Morrison et al. ........... 382/124 |
| 6,556,127 B1 * | 4/2003 | Moser et al. ............... 340/5.84 |
| 6,603,462 B2 * | 8/2003 | Matusis ...................... 340/5.83 |
| 6,621,013 B2 * | 9/2003 | Tanida et al. ............. 177/25.19 |
| 6,636,620 B1 * | 10/2003 | Hoshino .................... 340/5.53 |

FOREIGN PATENT DOCUMENTS

| | | |
|---|---|---|
| DE | 4009951 | 10/1991 |
| DE | 4331300 | 3/1995 |
| DE | 19501531 | 9/1995 |
| EP | 0991027 | 4/2000 |
| WO | WO97/26471 | 7/1997 |

OTHER PUBLICATIONS

U.S. patent application publication #2003/0018522 A1 (Denimarck et al.) Jan. 23, 2003.*

* cited by examiner

*Primary Examiner*—Randy W. Gibson
(74) *Attorney, Agent, or Firm*—Burns, Doane, Swecker & Mathis, L.L.P.

(57) ABSTRACT

A measuring apparatus, for instance an analytical balance, can set parameter values for performing specific measuring tasks and/or for effecting communication with an operating person. Sets of such parameter values are stored as profiles. The measuring apparatus is equipped with a recognition device, for recognizing an operating person and activating a stored profile assigned to that person.

16 Claims, 2 Drawing Sheets

MEASURING APPARATUS WITH USER PROFILE

CROSS-REFERENCE TO RELATED APPLICATIONS

This application claims priority under 35 U.S.C. §119 to German Application 100 39 668.2 filed in Germany on Aug. 14, 2000, and is a continuation application under 35 U.S.C. §120 of PCT/IB01/01438, designating the United States, filed Aug. 13, 2001, both of which are incorporated herein by reference.

BACKGROUND

The invention relates to a measuring apparatus, in particular a laboratory measuring instrument such as an analytical balance, which has means of setting values of parameters for performing specific measurement tasks, and/or for effecting communication with an operating person, and which has such sets of parameter values stored as profiles.

Measuring apparatuses of the type described are known in a great diversity of embodiments. Depending on the type of measurement, the complexity and accuracy of the apparatus, and the operating convenience offered, they differ mainly in the number of settable, and especially storable, parameter values. Storing sets of parameter values as user profiles is widespread, for example, in the PC world. On measuring apparatuses, however, the settings are of even greater significance: an inappropriate setting can distort the measurement result, or even destroy an instrument. For example, in a laboratory there are often many operating persons working at different tasks, all of whom need to use one laboratory balance. Normally, a balance can be adapted to the respective needs of an operating person by setting certain parameters, i.e. by entering a profile; examples of such settings are, for instance, the stabilization time and vibration filtering—which affect the accuracy of the measurement—the unit of measurement, and the language appearing on an alphanumeric display device. An embodiment of a balance of this type can be found, for instance, in U.S. Pat. No. 4,676,327, which provides a special operating field for entering specific settings before the actual weighing (column 2, lines 53–64), and which is hereby incorporated by reference.

However, even setting only the most important parameters is very time-consuming. For this reason, an operating person prefers to use a balance with its own preset profile. Also in this manner, setting errors can be better avoided. As a rule, high investment costs and extensive space requirements make it infeasible to provide in a laboratory a separate balance for each operating person, or for every frequently-used application. On the other hand, with the electronics available today, saving on one and the same balance different preset sets of parameters for different people or measuring tasks is possible without major additional outlay.

Activation of saved profiles by the operating person requires manual inputs, comprising as a rule depression of several touch keys in succession, which is also time-consuming and subject to error. Alternatively, there can be a large number of keys available, and a profile can be activated by depressing one single key. Although this can be faster, it can involve a large input device, the possible number of profiles can be limited by the number of keys, and the risk of depressing an incorrect key is also present.

The problem therefore presents itself of improving a measuring apparatus with stored user profiles in such manner that for each operating person and/or specific measuring task to be performed by them, the correct set of parameter values for them can be set rapidly and with great accuracy.

SUMMARY

The problem is solved by a device assigned to the measuring apparatus which can recognize the operating person, and activate a set of parameter values stored for that person. The set of parameter values can include settings preferred by the operating person, as well as settings necessary for a specific measurement task generally assigned to that operating person.

The proposed solution makes use of the fact that the number of persons and applications for which a profile is stored is indeterminate, but finite, and not large. Because of this, the demands on a recognition device are quite modest. A recognition device can function, for example, as follows. Signals which are present and affected by the operating person are analyzed according to certain criteria, which can take account of uncertainty. The result is a possibly incomplete set of values for the individual criteria. The specific combination of values characterizes the signal and allows discrimination, in other words differentiation, by classification of different signals. For each operating person registered, a unique, specific combination of values is stored. The recognition device compares the combination of the weighted criteria of the analyzed signal with the stored combination of values and, should there be a match, determines from which person the signals most probably originate.

Analysis of the signals becomes especially easy if there are certain transmission signals with specific characteristics to which the receiver especially responds. Because of this, the operating person can carry with them a transmitter whose signals can be identified beyond doubt by the measuring apparatus, or more precisely, the receiver of the recognition device belonging to the means for processing and weighting the personally affected signals. In consequence, the measuring apparatus can with great reliability cause activation of the correct set of parameter values. Such transmitters can be constructed with small dimensions, and designed as needed. They can, for example, be integrated into a badge to be worn in the laboratory in any case, or into a personal object which is always worn, such as a wristwatch or finger ring.

The analysis criteria naturally take account primarily of characteristics which can be used to classify, or differentiate, the signals of different operating persons from each other. Such signals can also originate directly from the operating person, and be emanated by them involuntarily. Examples of such signals are the radiation of heat and its distribution, the silhouette, and the voice. The latter can also be readily recognized at a distance. The analysis is more involved than when receiving an active signal from a transmitter. However, the advantage is that the person themself is detected, not simply an object assigned to them.

An exemplary embodiment envisages the measuring apparatus being provided with a transmitter, a single transmitter being capable of serving several measuring apparatuses. The receiver detects the person-dependent changes in the transmitted signal. This is especially pronounced, and possible with great reliability, if the operating person bears a transponder, a device which modifies the transmitted signal in specific manner and returns it at relatively high power. Discrimination then becomes particularly easy, and validation extremely reliable. Transponders can be passive electric circuits, so that they do not need to be supplied with electric power. With regard to their physical design, the same considerations apply analogously as were described for the individual transmitters borne by the operating person.

Validation of a (personal) object which the person bears is a particularly suitable variant if it is less the person themself than the specific measuring task which is of primary interest, and if the object carried activates the application-related set of parameter values in the measuring apparatus. In this way it is possible, for example, to have available in a laboratory a large number of transponders, each of which is coded for activation of a specific parameter set, which set is itself optimized for a specific measuring task. To perform a specific measuring task, the operating person takes the corresponding transponder and approaches a measuring apparatus selected freely from several present in the laboratory, which after validation automatically makes appropriate settings. The coding of the transponder can also take account of individual circumstances of the operating person.

If it is particularly important that the person actually operating really is the person determined by the validation, and the one for whom a profile should be set, this can be verified by an additional means of confirming the identified person. A common means of so doing is by entering a password, which however only verifies that the operating person has at their disposal the information which gives the validated person access to further actions. If the operating person themself must be identified directly, this makes reading a biometric feature necessary, for example analyzing a fingerprint. The measuring apparatus can provide for considering in the normal case, when the detected signal can be discriminated without difficulty, only validation, but in exceptional cases, when discrimination, validation, and therefore recognition at the first level prove difficult, or special functions require greater security, for requesting verification. Again, given the relatively small numbers needing to be considered, the demands on biometric identification are not very high. It may well be sufficient if validation as well as verification, which take place according to different criteria, are both only moderately reliable, since the probability that both systems identify the person as being the same person who they are in fact not, is in any case very low.

In many cases, occasional incorrect validation may not present a problem, provided the operating person takes note of this and can take corrective action. It should also be possible to change a prompted, or already activated, set of parameter values, if other values are required for the immediate measurement needing to be performed. Provision can therefore be made for dividing the profile into sub-profiles, which are successively activated in dialog with the operating person. Thus, after validation, the measuring apparatus can address to the operating person a message of greeting, from which the validation is apparent, can announce the remaining profile which will be activated—which can, for example, depend on the transponder being used—and can request confirmation. Only after the operating person has confirmed, does activation continue. Alternatively, confirmation does not take place, and the measuring apparatus switches into a mode which allows normal inputs, including changes to parameter values. Moreover, the measuring apparatus can be so designed that it undertakes activation of the set of parameter values on the basis of more than one signal recognition, for example validating the operating person by analyzing biometric data, and making task-dependent settings based on a transponder signal which can be person-independent.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

The invention so far outlined will now be illustrated by a more concrete description of an exemplary application, but without being restricted thereto.

Figure 1:
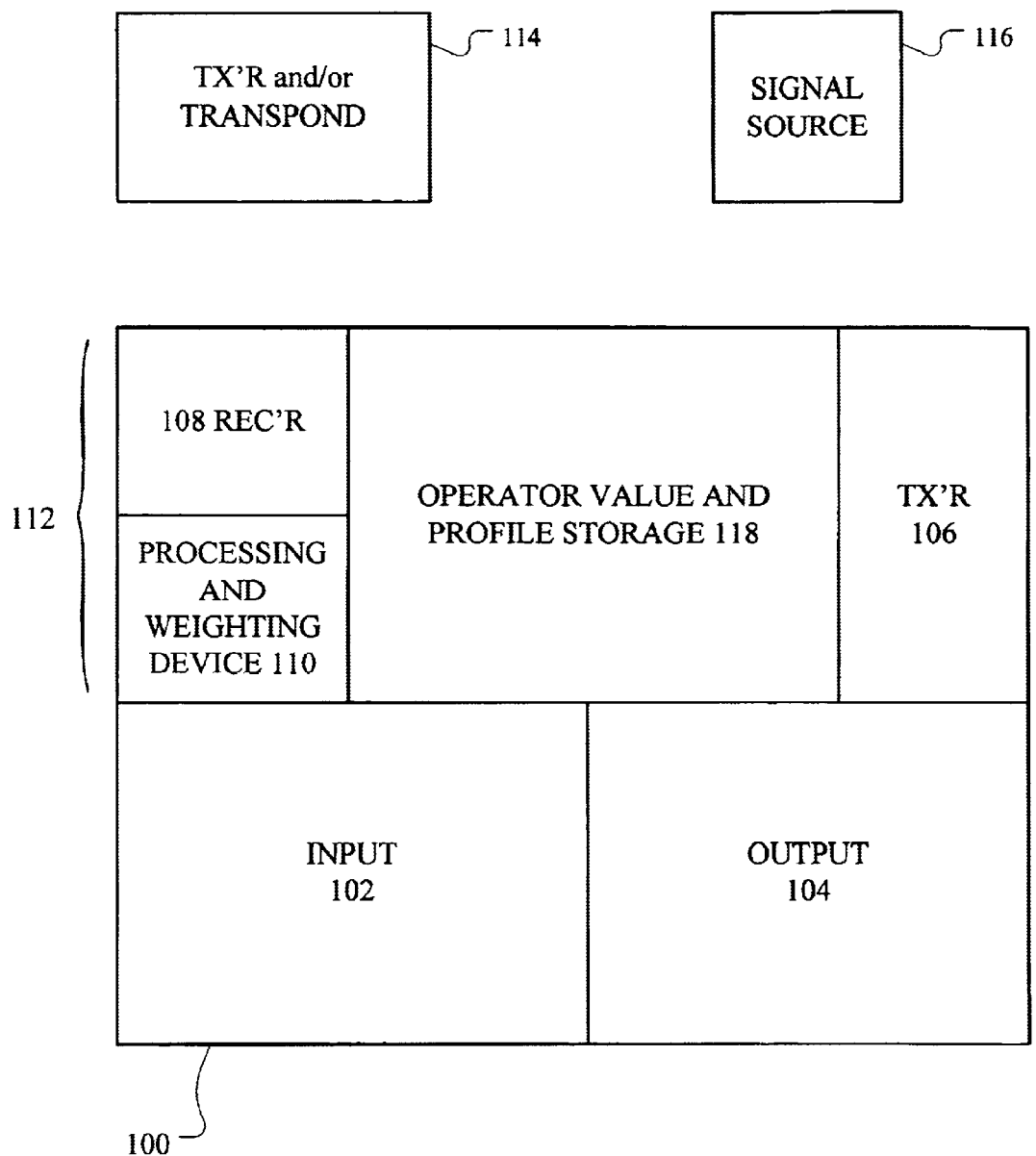
FIG. 1 is an exemplary measuring apparatus.

A representation of an exemplary FIG. 1 measuring apparatus 100 in a laboratory is an analytical balance, which can be of compact form and have at the front an input device 102 and an output device 104 which can collectively include an operating panel with a viewing screen in the form of a touch screen, and several touch keys. Such a balance is generally described in U.S. Pat. No. 4,676,327. Present as further elements in the input/output device can be, for example, proximity sensors, microphones, a loudspeaker, any suitable speech recognition processor and software, and/or any other desired input/output devices. The exemplary FIG. 1 measuring apparatus 100 also contains a transmitting/receiving device which can be attuned to passive transponders built into badges. The transmitting/receiving device can be configured as a transmitter 106 and/or as a receiver 108. Those skilled in the art will appreciate that any suitable transponder and/or transmitter/receiver system can be used. An exemplary transponder and transmitter/receiver system is described in U.S. Pat. No. 4,517,563 and in WO 97/26471 which are incorporated herein by reference.

In the FIG. 1 example, a receiver is included in a processing and weighting means 110 of an operating person recognition device 112. Users of this balance are various operating persons, whose number is on the order of a dozen. These bear on their body a badge which they use for opening doors in the laboratory building and suchlike; welded into this badge can be passive transponder (e.g., transponder 114 and/or alternately, a transmitter 116). The transponder is trimmed (e.g., programmed) when the badge is created. Each transponder receives its own individual trimming, which can occur only once in the entire system with the badges. In response to the signal transmitted by the laboratory balance, the transponder returns a signal modified in characteristic manner, which can be readily discriminated by the receiver of the balance, using any suitable, readily available transmitter/transponder. A further measuring apparatus than the balance described can have an identical transmitting/receiving device with a different transmission signal, but to which the transponder reacts in the same manner, so that different measuring apparatuses can address and recognize the same transponder.

The balance possesses various possibilities of setting for specific tasks, some of which will be described for illustration. When a load is placed on the weighing pan, the latter tends to oscillate. If it is desired for the weight to be displayed quickly, and it is accepted that a certain tendency to oscillate remains, and that the measurement is therefore less accurate, less damping will be desired than in the opposite case. The damping can therefore be set. The display of the balance allows the units being displayed (gram, ounce, carat, etc.) to be changed. For certain applications a calculated value is displayed, e.g. the number of pieces or the volume. The mode and the display unit are also settable parameters. Other pre-settings of the balance can, for instance, relate to the way of performing the weighing, such as dispensing weighing, in which individual components are added to a mixture, and after each weighing of an added component, resetting to zero takes place automatically. Another frequently used type of weighing is so-called differential weighing in which, for instance, a moist substance is first weighed, the weighing result saved, the substance dried in its container, and then re-weighed. A further frequent form of weighing for items which are themselves identical is multiple weighing, in which the individual weight is calculated by dividing the total weight by the number of items. Further functions usually dependent on the user and/or the type of their work can be motorized or manual operation of a door of a draft shield, the function of an actuating sensor (open/close draft shield door, tare), or operation of a printer, should one be connected. All these, and other, functions are dependent on the wishes and/or activity of a user, who must frequently set a predefined profile of such parameters for his/her purposes. It is now readily apparent that if several persons take it in turn to use the balance for different tasks, it would be very tedious to have to check after every change of person which settings must be retained, and which newly set.

For this reason, the balance can have a menu item with which the settings of some or all the parameters can be saved as a profile once they have been made (e.g., in a profile storage 118). This can take place many times, with each profile being assigned a designation. Furthermore, the balance according to the invention can administer the users, meaning it can store a list of registered users and assign the defined profile to the user. A single user can call multiple profiles his own.

So that the balance can validate a user, the balance can store the user's "personal characteristics". In the present case, the balance can have stored the response of a certain transponder to the signal transmitted from the balance. For this once-only input, a special menu item is provided which is only accessible to persons with special access authorization. Validation can, for example, be based on proper entry of data (e.g., a password), and/or biometric feature analysis, and/or any desired, suitable validation technique. Exemplary techniques for identification of a user in a manner as described herein are set forth in, for example, DE 195 01 531C2; DE 43 31 300A1 and DE 40 09 951C2, all of which are incorporated herein by reference.

Figure 2:
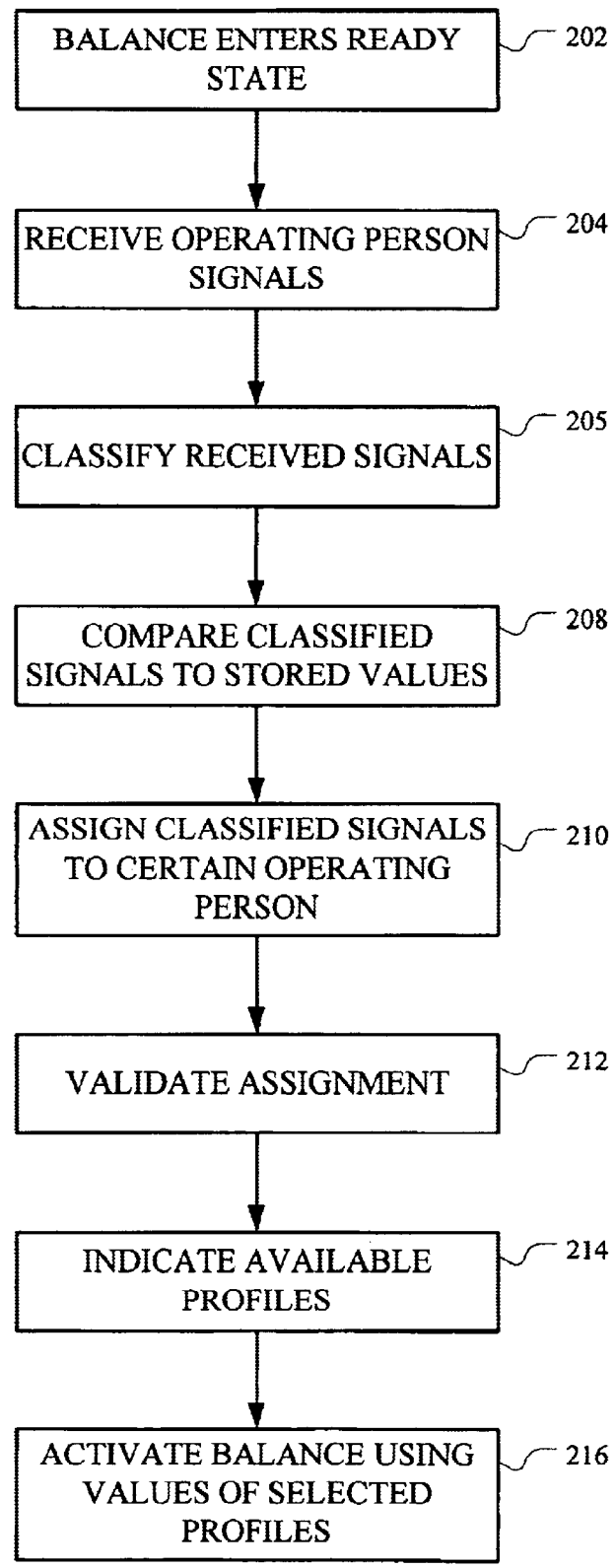
FIG. 2 is a flow chart showing an exemplary operation of the FIG. 1 measuring apparatus.

An exemplary instance of using the analytical balance in the laboratory can proceed as follows, with reference to the FIG. 2 flowchart 200. The balance is in the ready state in block 202, with an operating person is working with it. A colleague approaches, and waits until the balance becomes free. Both persons are bearing their badges. The balance does not yet react to the second person. Only after the first weighing operation is complete, and the balance made free, does the balance respond to transmitted signals and/or signals modified by a transponder in block 204 to greet the second person with their name over the loudspeaker and/or on the display screen. The received signals are classified in block 206 according to any desired criteria to be used for identifying an operating person, compared to stored values used to differentiate users in block 208, and then assigned to a certain operating person in block 210. Subsequent operation takes place based on an optional validation in block 212, for example, with the transponder signal. If, contrary to expectation, the name should not be correct, the operating person would answer with "Wrong name" or suchlike, and the balance would switch into setting mode, in the same way as it is available to all users who are not stored. If the name is correct, the operating person can confirm this by microphone input, or pressing a key, or waiting for a period of time, after which progress to the next step takes place automatically. The balance then indicates which profiles are available to the operating person in block 214, and/or which profile was last used by that person. The operating person has the choice between making a selection, or again waiting for a certain period of time, after which the profile last used by that person is set. Parameter values assigned to the profile can then be used for performing a selected measurement task in block 216.

However, the dialog also provides the option of not selecting any of the profiles, whereupon a standard profile is set, and changeover to setting modus takes place. Thereupon, before or after the weighing operation, a newly set profile can be saved as a further profile.

Let it be further assumed that the second operating person does not wish to weigh, but wishes to enter a third person into the balance as user. The second person can be authorized to do this, but only if verified as the operating person. For example, the second person can first use a fingerprint reading system, which grants release.

Although the invention is illustrated by the example of a laboratory, where the operating person remains in the vicinity of the measuring apparatus, it is not limited thereto. Measuring apparatuses, including balances, can be operated from a distance, for example over the Internet. In such cases, validation can take place automatically, for example through speech, if there is simultaneously a speech connection, or through the manner typical for the person in which a mark is traced over the input medium, usually the viewing screen.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Measuring apparatus comprising:
   means of setting values of parameters for performing specific measurement tasks, and/or for effecting communication with an operating person;
   means for storing sets of parameter values as profiles. said stored profiles, being determinative for the specific measurement tasks and/or a way the operating person communicates with the apparatus; and
   a recognition device for recognizing an operating person and activating a stored profile assigned to that person, wherein said operating person being one who commands and controls the measuring apparatus to perform the specific measurement tasks.

2. Measuring apparatus according to claim 1, wherein the recognition device contains:
   means for processing and weighting personally affected signals according to prescribed criteria; and
   means for assigning combinations of weighted criteria to certain persons.

3. Measuring apparatus according to claim 2, wherein the means for processing and weighting personally affected signals contains:
   a receiver, which responds to specific transmitted signals.

4. Measuring apparatus according to claim 3, wherein the transmitted signals originate from a transmitter borne by, and identifying, the operating person.

5. Measuring apparatus according to claim 3, wherein the transmitted signals are biometric signals involuntarily emanated by the operating person.

6. Measuring apparatus according to claim 3, comprising:

a transmitter, wherein the receiver responds to specific, person-dependent changes which occur in transmitted signals from the transmitter.

7. Measuring apparatus according to claim 6, wherein the receiver is configured to identify the operating person in response to a signal from a transponder which identifies the operating person.

8. Measuring apparatus according to claim 4, wherein irrespective of the operating person, the transmitter activates an application-specific profile which is selected in dependence on the transmitter.

9. Measuring apparatus according to claim 1, wherein the recognition device comprises:

a means of confirming the operating person.

10. Measuring apparatus according to claim 1, comprising:

an input and output device, via which the operating person, after activating a profile, can set and store parameter values, and thereby change the profile.

11. Measuring apparatus according to claim 10, wherein the profile comprises several sub-profiles, which are successively activated and deactivated by the recognition device, taking into account inputs.

12. Method of setting a measuring apparatus to certain parameter values for performing specific measuring tasks, and/or effecting communication with an operating person, comprising:

recognizing an operating person, said operating person being one who commands and controls the measuring apparatus to perform measurement tasks; and activating a set of parameter values assigned to the operating person in response to the step of recognizing; wherein said activated set of parameter values are determinative for the specific measurement tasks and/ or a way the operating person communicates with the measuring apparatus.

13. Method according to claim 12, comprising:

analyzing operating person dependent signals using a recognition device assigned to the measuring apparatus;

classifying the operating person-dependent signals according to given criteria;

comparing the operating person-dependent signals with stored values;

on sufficient match, undertaking assignment of the analyzed operating person-dependent signals to a certain operating person; and activating a set of parameter values assigned to the operating person.

14. Method according to claim 13, wherein activation of the set of parameter values takes place in steps, information is output to the operating person, and each next step is dependent on an input.

15. Measuring apparatus according to claim 1, for use as an analytical balance.

16. Measuring apparatus according to claim 1, wherein irrespective of the operating person, an application-specific profile is selected in dependence on a transponder.

* * * * *